United States Patent
Weinstock et al.

[15] 3,653,616
[45] Apr. 4, 1972

[54] CUTTING MECHANISM

[72] Inventors: Manuel Weinstock; Osyp Nimylowycz, both of Philadelphia, Pa.; Edward J. Wiggett, Cinnaminson, N.J.; Obie Palmer, Philadelphia, Pa.

[73] Assignee: The United States of America as represented by the Secretary of the Army

[22] Filed: June 24, 1970

[21] Appl. No.: 49,357

[52] U.S. Cl. ............................................................244/150
[51] Int. Cl. ............................................................B64d 17/58
[58] Field of Search ..........................244/150, 147, 142

[56] References Cited

UNITED STATES PATENTS

| | | |
|---|---|---|
| 3,408,026 | 10/1968 | Kriesel ..................................244/152 |
| 3,468,502 | 9/1969 | Kinney ..................................244/150 |
| 3,388,879 | 6/1968 | Piasano et al. ......................244/152 |

Primary Examiner—Milton Buchler
Assistant Examiner—Carl A. Rutledge
Attorney—Harry M. Saragovitz, Edward J. Kelly, Herbert Berl and Sheldon Kanars

[57] ABSTRACT

A parachute arrangement for pin point soft landing air cargo that includes a hand settable time delay cutting mechanism for cutting the reefing line of a cargo attached parachute after a predetermined drag force has been exerted upon a release pin cable. The mechanism includes a ballistic cutting blade carrying a powder charge in alignment with a timer controlled firing pin. A release pin actuates the timer when the cable drag force removes the release pin from its normal position extending in the path of a timer lock member.

7 Claims, 1 Drawing Figure

PATENTED APR 4 1972 3,653,616
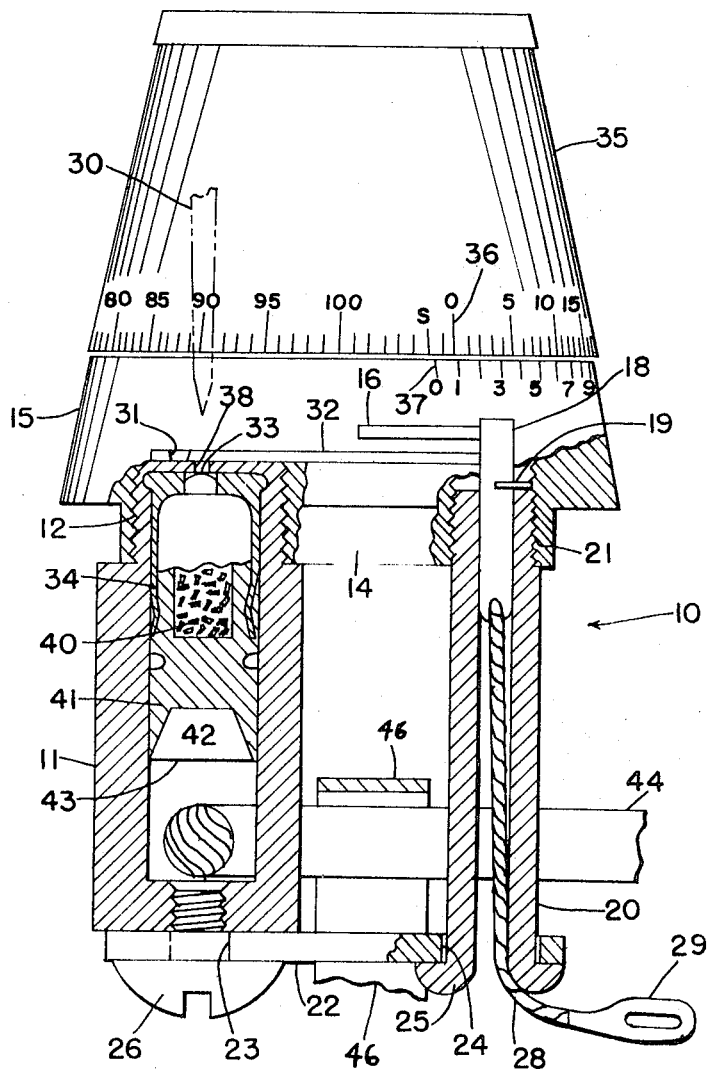
INVENTORS
BY MANUEL WEINSTOCK
OSYP NIMYLOWYCZ
EDWARD J. WIGGETT
OBIE PALMER
By: Harry M. Saragovitz, Edward J. Kelly,
Herbert Berl & Sheldon Kanars ATTORNEYS

CUTTING MECHANISM

The invention described may be manufactured, used, and licensed by or for the Government for governmental purposes without the payment to us of any royalty thereon.

This invention relates to a cutting mechanism and, more particularly, to a cutting mechanism employed in a cargo parachute arrangement.

Present cargo delivery from aircraft is faced with inaccuracies in pin point delivery of cargo by parachute due to variables such as drop height and prevailing winds.

It is an object of the invention to provide a cargo parachute arrangement in which delivery is made with a pin point soft landing.

Another object of the invention is to provide such a cargo parachute arrangement having a predetermined free fall time to compensate for flight variables that would otherwise disrupt the accuracy of the cargo drop.

These and other objects, features and advantages will become more apparent from the following description and accompanying drawing in which the sole FIGURE is an elevational view, partially broken away in section, of a delay cutter embodying the principles of the invention.

The cargo parachute arrangement, shown generally at 10, includes a hand settable time delay cutting mechanism in which a cylindrical cutting chamber body 11 has a reduced threaded boss 12 for securement in a suitable tapped opening in the protruding bottom portion or boss 14 of the timing fuze body 15. The timing fuze mechanism has a movement escapement system in which a spring loaded hairspring or locking member 16 is precluded from normal timer movement by the release pin 18 extending in its operative path when retained or held by shear pin 19 against relative longitudinal movement within hollow tube or cylinder 20. Cylinder 20 has one threaded end 21 for securement in a second tapped opening in boss 14 and is held substantially parallel to cutting cylinder 11 by connecting plate 22. Plate 22 has a suitable pair of apertures 23, 24 that enable it to be clamped against or abutted by the outwardly turned cylinder flange 25 when the plate is secured to the free end of cylinder 11 by the threaded mounting screw 26. The outward end of release pin 18 has appropriately secured to it one end of an elongated flexible cable 28 which is of predetermined length and terminates in an enlarged loop or eyelet 29 so that the cable 28, when subjected to a predetermined drag force in a cargo parachute release from its delivering aircraft, will be tensioned sufficiently to fracture shear pin 19 that has a portion extending radially outward of pin 18 and behind tube 20. Thus, the release pin 18 is extracted from the mechanism by the tensioned cable and the spring loaded timer lock member 16 is freed along with the remainder of the movement escapement system such that the clock or timer mechanism can function to enable the ultimately released firing pin 30 to pass through opening 31 of rotated or pivoted barrier plate 32 and strike the percussion primer 33 centrally located in the rearward end of cartridge 34. The upper frusto-conical portion 35 of the fuze body 15 is suitably mounted for relative rotation such that predetermined hand settings of the respective indicia 36, 37 will control the point in time after removal of pin 18 that the firing pin 30 will strike primer 33 through aligned hole 31 and central opening 38 of cutting chamber 11.

The cartridge 34 contains a powder charge 40 which has the capability of rapidly releasing the cutting member 41 from its crimped or secured position within the mouth of cartridge 34. The cylindrical cutter 41 has a forward annular and partially conical recess 42 to define the circular cutting edge 43, and when the explosive cutter 41 is actuated it will sever the reefing line 44 that is suitably positioned transversely through cutting cylinder 11 and appropriately secured in the path of cutting edge 43. The reefing line 44 passes through the cargo parachute loop 46 which normally extends through the substantially rectangular space between the parallel cylinders 11, 20.

We wish it to be understood that we do not desire to be limited to the exact details of construction shown and described, for obvious modifications will occur to a person skilled in the art.

We claim:

1. In a parachute arrangement for pin point soft landing air cargo having a continuously settable mechanical time delay cutting mechanism, and a cargo attached parachute with a reefing line thereof secured transversely through a cutting chamber of said mechanism and positioned forwardly of a cutting blade slidably mounted in said chamber, said mechanism including a timer controlled firing pin for igniting a powder charge in a rearward portion of said chamber and a spring loaded timer lock member, a release pin normally extending in the path of said timer lock member, and a parachute cable secured to said release pin and capable of being subjected to a predetermined drag force prior to releasing said pin from its normally extending position.

2. The structure in accordance with claim 1 wherein said delay cutting mechanism includes a timing fuze member, said firing pin and said spring loaded timer lock member being located within said fuze member, said fuze member having a protruding bottom portion that has a pair of threaded openings, a first cylinder defining said cutting chamber secured in one of said openings in alignment with said firing pin, a second cylinder secured in the other of said openings and slidably receiving said release pin.

3. The structure of claim 2 wherein said first and second cylinders extend substantially parallel to each other, and a plate having a pair of apertures interconnects said first and second cylinders.

4. The structure of claim 2 in which a shear pin is carried by said release pin and extends laterally therefrom in the path of said second cylinder.

5. The structure of claim 1 wherein said cutting blade is defined by a cylindrical body having an annular recess in the forward face thereof.

6. A continuously settable mechanical time delay cutting mechanism for pin point soft landing air cargo comprising a fuze containing a timer controlled firing pin and a spring loaded timer lock member, a release pin normally extending in the path of said timer lock member, a cable secured to said release pin and capable of being subjected to a predetermined drag force prior to releasing said pin from its normally extending position, a cutting chamber secured to said fuze and adapted to house a transversely extending parachute reefing line, a cutting blade slidably mounted in said chamber and having a powder charge in its rearward end in alignment with said firing pin, so constructed and arranged that said cutting blade can be operated upon said cable being subjected to a sufficient drag force.

7. The structure of claim 6 wherein an elongated tubular body is secured to said fuze and houses substantial portions of said release pin and cable, and an apertured plate interconnects said chamber and tubular body.

* * * * *